(12) United States Patent
Pritchard et al.

(10) Patent No.: US 7,111,470 B2
(45) Date of Patent: Sep. 26, 2006

(54) VARIABLE EVAPORATOR CONTROL FOR A GAS DRYER

(75) Inventors: Brian W. Pritchard, McKees Rocks, PA (US); Mark F. Honath, McKees Rocks, PA (US); Timothy J. Fox, Waynesburg, PA (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/802,761

(22) Filed: Mar. 18, 2004

(65) Prior Publication Data
US 2004/0172953 A1    Sep. 9, 2004

Related U.S. Application Data

(63) Continuation of application No. 10/123,565, filed on Apr. 16, 2002, now Pat. No. 6,711,906.

(60) Provisional application No. 60/285,528, filed on Apr. 20, 2001.

(51) Int. Cl.
*F25D 41/00* (2006.01)
*F25B 17/02* (2006.01)

(52) U.S. Cl. .............................. 62/208; 62/96

(58) Field of Classification Search .................. 62/93, 62/208, 196.4, 513, 525, 176.6, 197
See application file for complete search history.

(56) References Cited

U.S. PATENT DOCUMENTS

| | | | |
|---|---|---|---|
| 3,585,808 A | 6/1971 | Huffman | |
| 3,797,565 A | 3/1974 | Fernandes | |
| 4,240,266 A | 12/1980 | Scrine et al. | |
| 4,520,866 A | 6/1985 | Nakajima et al. | |
| 4,628,696 A | 12/1986 | Rodgers | |
| 4,689,969 A | 9/1987 | Van Steenburgh, Jr. | |
| 5,065,584 A | 11/1991 | Byczynski et al. | |
| 5,237,832 A | 8/1993 | Alston | |
| 5,343,715 A | 9/1994 | Lang | |
| 5,634,349 A | 6/1997 | Kakehashi et al. | |
| 5,651,268 A | 7/1997 | Aikawa et al. | |
| 5,695,614 A | 12/1997 | Hording et al. | |
| 6,244,058 B1 | 6/2001 | Duga et al. | |
| 6,427,464 B1 | 8/2002 | Beaverson et al. | |

FOREIGN PATENT DOCUMENTS

| | | |
|---|---|---|
| DE | 3131508 | 2/1983 |
| DE | 3522974 | 1/1987 |
| EP | 1103296 | 5/2001 |
| GB | 1139734 | 1/1969 |
| JP | 63173717 | 7/1988 |
| JP | 07151467 | 6/1995 |

*Primary Examiner*—Chen Wen Jiang
(74) *Attorney, Agent, or Firm*—Baker & Hostetler LLP

(57) ABSTRACT

A variable evaporator control system and method in a gas dryer for maximizing the cooling which can be accomplished for a given length heat exchanger by adjusting the evaporator refrigerant approach temperature responsive to changes in the gas load on the system. Pressure and/or temperature sensors positioned at particular locations in the system provide feedback for controlling adjustments in the approach temperature depending on the gas load.

8 Claims, 13 Drawing Sheets

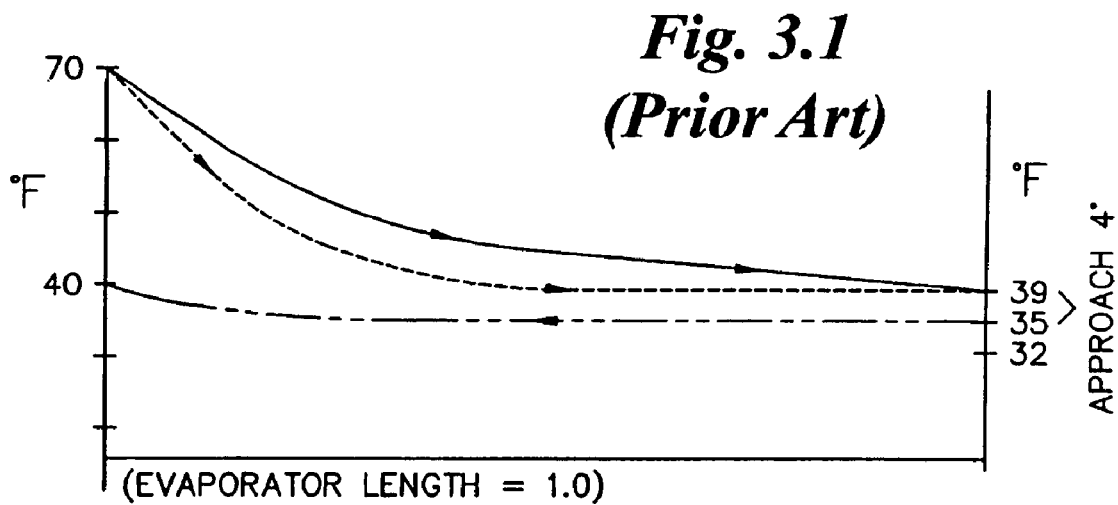
*Fig. 3.1*
*(Prior Art)*
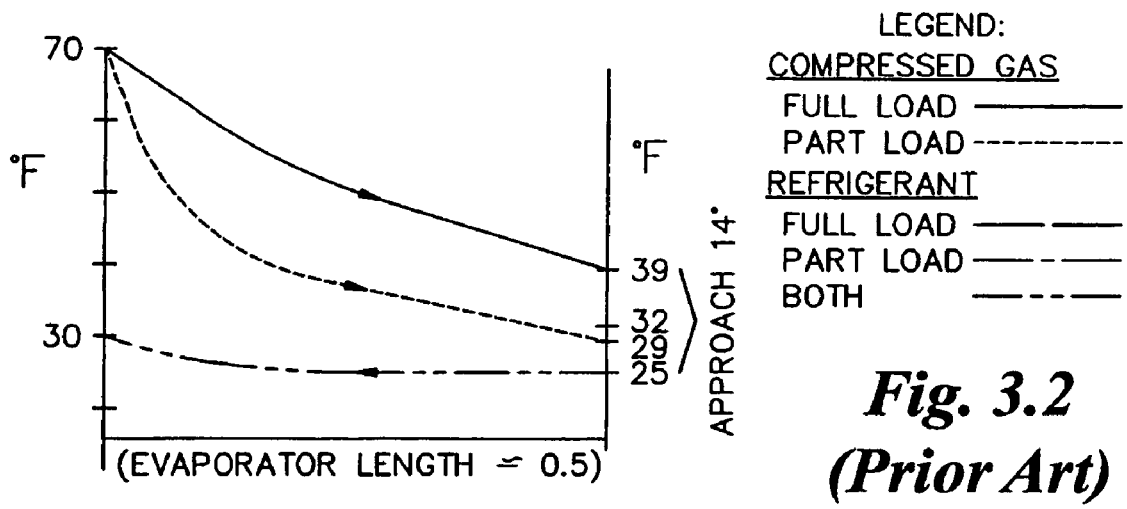
*Fig. 3.2*
*(Prior Art)*
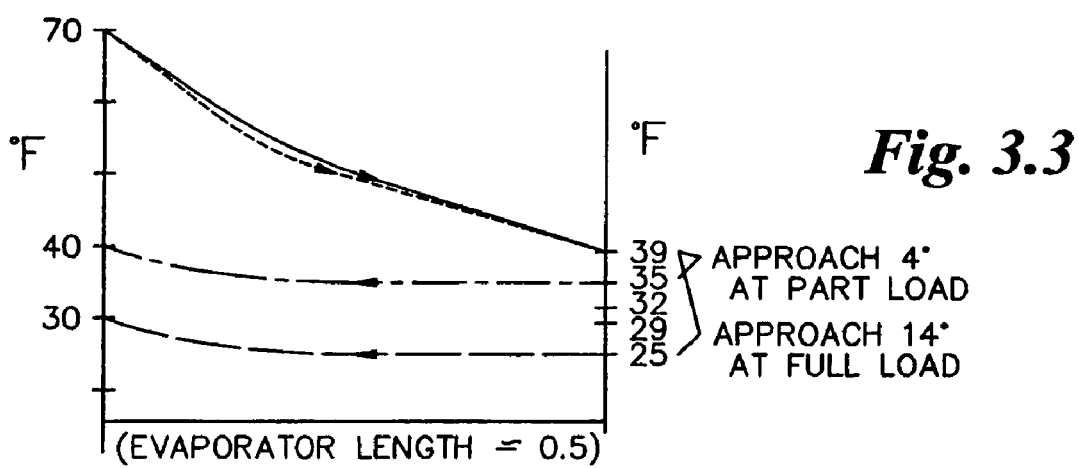
*Fig. 3.3*

VARIABLE EVAPORATOR CONTROL FOR A GAS DRYER

CROSS-REFERENCE TO RELATED APPLICATIONS

This application is a continuation application of Ser. No. 10/123,565, filed on Apr. 16, 2002, now U.S. Pat. No. 6,711,906 which claims priority to U.S. provisional patent application Ser. No. 60/285,528, filed Apr. 20, 2001, the disclosure of which is hereby incorporated by reference.

BACKGROUND

The invention relates generally to gas dryers, and more particularly to a variable evaporator control ("VEC") system and method for a refrigerated compressed gas dryer which provides for varying the refrigerant temperature responsive to changes in the compressed gas load on the refrigerant compressor.

Refrigerated compressed gas dryers are used to remove moisture and water vapor from compressed gas streams which are introduced through the gas compressor intake when the compressed gas is taken from the ambient with its accompanying relative humidity. Once the gas is compressed, its vapor holding capacity is reduced and the vapor condenses into a liquid as the gas is cooled. Prior art type refrigerated compressed gas dryers basically consist of a pre-cooler/re-heater heat exchanger, an evaporator heat exchanger, a liquid separator and a liquid drain valve. The warm compressed gas is passed through the pre-cooler/re-heater where it is cooled by the outgoing cooled gas stream. As the warm compressed gas stream is cooled moisture vapor begins to condense into a liquid. The compressed gas stream is then passed into the evaporator heat exchanger where it is further cooled to a lower temperature as the refrigerant evaporates at some temperature below the desired temperature of the compressed gas stream exiting the evaporator. More water vapor is condensed into a liquid state in the evaporator and the cooled gas stream is passed to the liquid separator where the condensed liquid is separated and removed from the system by the drain valve. The cooled and dried compressed gas stream is then returned through the pre-cooler/re-heater to pre-cool the warm incoming compressed gas stream prior to being returned to the compressed gas system piping. Compressed gas flow rates will vary as a function of time in nearly every compressed gas dryer application. The equipment can be expected to experience flows ranging from the maximum design flow rate down to a no-load, or zero, flow rate condition.

The refrigeration system of a typical refrigerated compressed gas dryer as described above basically consists of a refrigerant compressor, a refrigerant condenser, an expansion/restrictive device, and the evaporator described above. The temperature of the cooled compressed gas, as it exits the evaporator, defines the thermal performance of compressed gas dryers. This is typically expressed at the design flow rate. Increased cooling of the warm compressed gas results in lower exiting evaporator compressed gas temperatures and higher levels of moisture removal. However, there is a practical limit to the amount of cooling that can be done in the evaporator of a refrigerated gas dryer. Cooling the warm compressed gas stream down to a temperature below the freezing point of water creates a situation where the condensate can freeze and block the free path of the compressed gas stream, thus, increasing the pressure drop across the dryer. In extreme circumstances, the flow can be blocked completely, starving the downstream process of compressed gas. This failure situation will most likely occur during compressed gas flow rates that are much less than the maximum design flow rate. When using evaporators constructed from smooth tubing, the freeze-up failure potential necessitates that the refrigerant temperature in the evaporator be above the freezing point of water, and held fixed and steady, as the load varies from no load to full load. All manufacturers of refrigerated compressed gas drying equipment must address how to control the evaporator refrigerant temperature in order to prevent condensate freeze-up under low or no load operating conditions, while providing the thermal performance advertised at a full load situation.

Presently, the most common method of controlling the evaporator refrigerant temperature in the compressed gas dryer is through the use of a hot gas by-pass valve, which is a pressure-regulating valve that is set to maintain a constant refrigerant pressure in the evaporator and refrigerant compressor suction line. The by-pass valve operates by metering high-pressure refrigerant discharge gas into the refrigerant compressor suction line whenever the suction pressure drops below the set point of the pressure regulating by-pass valve. By understanding the saturation temperature/pressure correlation of the refrigerant gas, the evaporator refrigerant temperature can be indirectly regulated by maintaining a constant refrigerant suction pressure. This temperature/pressure correlation refers to the unique physical saturation properties of each refrigerant; that is, as a refrigerant changes phase from a liquid to a vapor (i.e., boils or evaporates), it will do so at a constant temperature and pressure. If the pressure is controlled and maintained while this phase change occurs, the temperature is also maintained. Therefore, the more precisely the pressure is maintained, the more accurately the evaporator temperature: is held constant. A typical pressure setting for the by-pass valve would be a refrigerant saturation pressure that corresponds to a saturation temperature of approximately 35 degrees Fahrenheit. Placing the equivalent temperature setting slightly above the freezing point of water allows for a small factor of safety in the event of any valve setting drift.

Another commonly used method to maintain a constant refrigerant suction pressure is to install an automatic pressure valve ("APV") in place of the expansion/restrictive device and the hot gas by-pass valve. The APV maintains proper refrigerant suction pressure by metering high-pressure liquid refrigerant into the inlet of the evaporator. The APV is typically inexpensive and inaccurate. Under no-load conditions, the liquid refrigerant may not be effectively converted into a gas in the evaporator, which can result in a liquid flood-back condition at the refrigerant compressor suction, with potential compressor damage. Also, as the load is applied to the dryer, the refrigerant suction pressure often increases, resulting in poor thermal performance. Some of the newer technologies used to maintain a constant refrigerant suction pressure include the use of variable speed refrigerant compressors which operate by altering the rotational speed, and therefore, the pumping capacity of the compressor. The refrigerant suction pressure can be increased or decreased by decreasing or increasing, respectively, the rotational speed of the compressor. Regardless of the manner of controlling the suction pressure, typical prior art control schemes function to maintain a constant suction pressure, and thus a constant evaporator refrigerant temperature, regardless of the load on the compressor. Consequently, prior art methods can suffer problems such as lower efficiency or freeze up conditions during compressor no-load conditions.

Many conventional compressed gas dryers utilize smooth tubes in the evaporator, which offer the advantage of a non-fouling surface that performs consistently throughout the life of the dryer. Other advantages are reduced pressure drop and relatively inexpensive manufacturing costs. A disadvantage of smooth tube technology is that a relatively large amount of heat exchange surface is necessary in order to achieve the desired thermal performance at the design full load condition. This can be particularly challenging when considering the no-load and partial load freeze up concerns discussed previously, as well as the need to operate the evaporator at 35 degrees Fahrenheit, offering a 4 degree Fahrenheit approach temperature. The efficient packaging of these dryers can be inherently more difficult. Extended surface heat exchanger tubes are often used in order to make the evaporator more compact. The externally finned surface of such designs offer a temperature gradient between the refrigerant and the compressed gas stream. This gradient can permit the refrigerant temperature to be less than the freezing point of water, without the danger of freeze-up. A reduced refrigerant temperature results in a larger temperature approach, and less required surface area. While the length required for this design is reduced as compared to the smooth tube designs, the cost of the tube, and the design, can generally be greater. The designer may also have to address the concerns of excessive pressure drop.

Small, compact heat exchangers, such as brazed plate, or bar and frame type heat exchangers, offer an extremely attractive packaging solution for a compressed gas dryer, but, again, can be much more costly than the smooth tube designs. As these designs do not incorporate extended surfaces and the above discussed temperature gradients, the refrigerant temperatures must remain above the freezing point of water in order to perform reliably under all operating conditions. A precise and constant evaporator refrigerant temperature control is imperative to these designs.

Due to the factors explained above, there has generally been no single optimum heat exchanger design for a compressed gas dryer. A problem has been that prior art designs are configured to maintain a constant suction pressure, and thus evaporator refrigerant temperature, regardless of the compressed gas load on the refrigerant compressor. Consequently, there has been a compromise between the desired features of thermal performance, pressure drop performance, reliable operation, size, cost and packaging. The shortcomings of prior art refrigerated compressed gas systems described above illustrates the need for a control system for a refrigerated compressed gas dryer which can vary the evaporator refrigerant temperature in response to changes in the load on the refrigerant compressor. Consequently, the cooling capability, per-unit length, of any given length heat exchanger can be maximized.

SUMMARY

A variable evaporator control system and method are provided for adjusting the evaporator refrigerant temperature responsive to changes in the load on the refrigerant compressor in a refrigerated compressed gas dryer. A control system according to the invention can utilize, for example, pressure and temperature sensors, a pair of temperature sensors, or a single appropriately positioned temperature sensor. Each of the sensors can be positioned at preselected locations in the system to provide feedback to a processor which can analyze the output in order to determine whether to increase or decrease the approach temperature, i.e., the difference between the temperature of the warm gas and the refrigerant temperature at the inlet of the heat exchanger. The control system can preferably include at least one temperature sensor for monitoring the temperature of the refrigerant at the evaporator. The refrigerant suction pressure can be controlled to vary the temperature of the refrigerant at the evaporator inlet to generally maintain a desired outlet compressed gas temperature irrespective of the load on the refrigerant compressor. In this way, the temperature of the dried compressed gas exiting the evaporator is generally maintained while making efficient use of the evaporator. For example, the evaporator can have a shorter effective length and still provide the desired level of cooling both at maximum design load for the evaporator and also during low or zero load on the refrigerant compressor. This can be accomplished while avoiding potential freeze up problems which conventionally occur in systems which maintain a generally constant suction line pressure regardless of the load on the compressor. Moreover, this can be accomplished using a smooth tube evaporator with all of the attendant advantages while avoiding the potential freeze up problems which can be problematic with smooth tube designs.

According to the invention, the refrigerant suction pressure can be adjustably controlled in different ways, including, for example, using an electrically adjustable by-pass valve, varying the speed of a variable speed compressor, or using an unloading compressor arrangement. Adjustments in the refrigerant temperature at the inlet of the heat exchanger can be made generally in response to changes in the load on the compressor. In particular, a lower refrigerant temperature can be maintained where there is a high load on the compressor. However, as the load on the compressor decreases, the refrigerant temperature can be adjusted upwards, in order to avoid potential freeze up problems which could occur if the compressed gas temperature were reduced below the freezing point of water. In a presently preferred embodiment, temperature can be sensed at a single point in the system wherein the temperature is indicative of the load on the compressor. Feedback from this single point temperature sensor can be utilized to adjust the approach temperature depending on the load on the compressor.

Other details, objects, and advantages of the invention will become apparent from the following detailed description and the accompanying drawing FIGS. of certain embodiments thereof.

BRIEF DESCRIPTION OF THE DRAWINGS

A more complete understanding of the invention can be obtained by considering the following detailed description in conjunction with the accompanying drawings, wherein:

FIG. 3.1 graphically illustrates temperature profiles of prior art compressed gas dryers, such as shown in FIGS. 1 and 2, employing a 4 degree approach temperature.

FIG. 3.2 graphically illustrates temperature profiles of prior art compressed gas dryers, similar to FIG. 3.1, except employing a 14 degree approach temperature.

FIG. 3.3 graphically illustrates temperature profiles of a compressed gas dryer utilizing a control system and method according to the invention.

DETAILED DESCRIPTION

Figure 1:
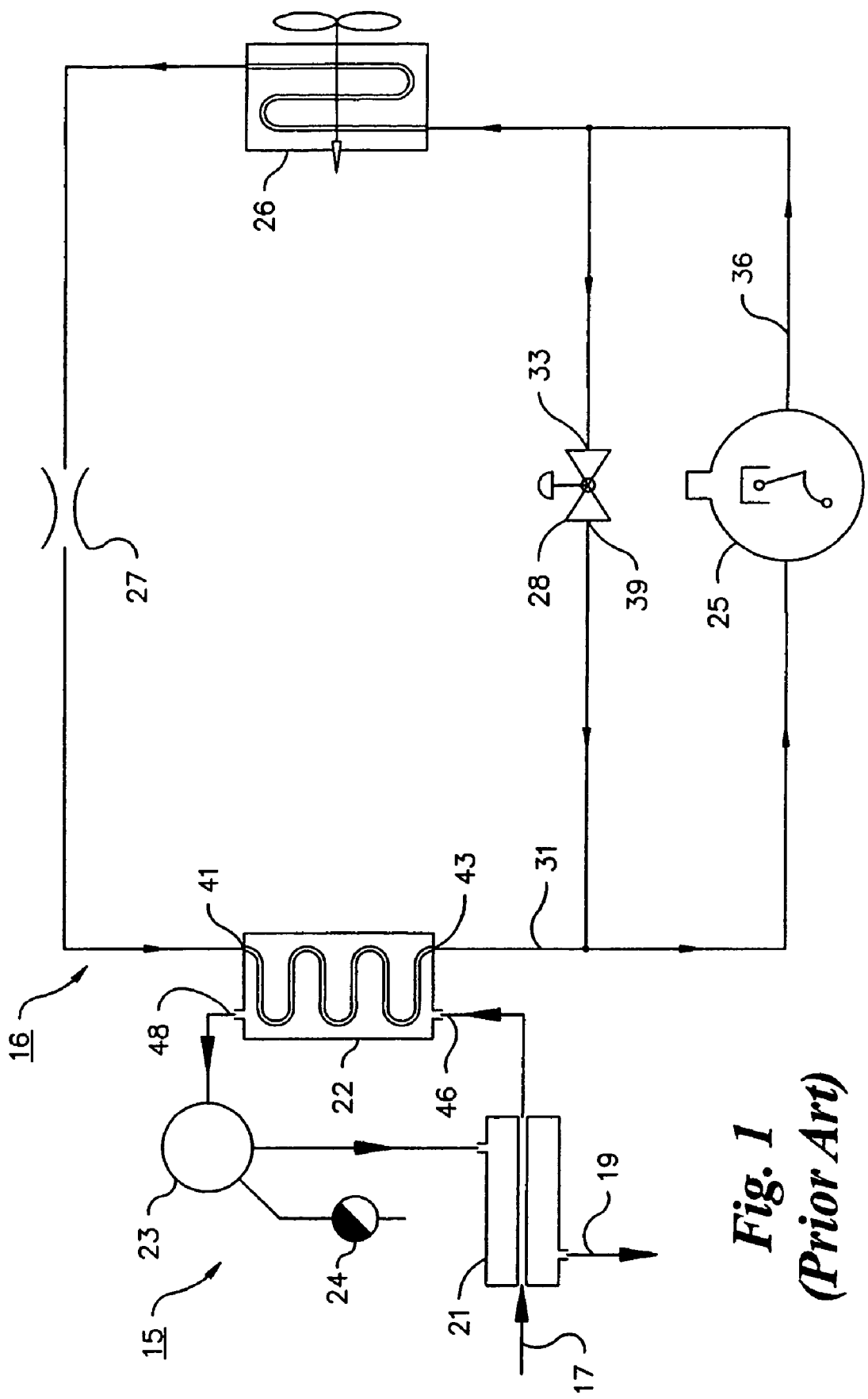
FIG. 1 illustrates diagrammatically a prior art refrigerated compressed gas dryer which uses a by-pass valve to regulate suction pressure.

Before describing the invention, a more detailed description of prior art type refrigerated compressed gas dryers is provided for ease of understanding more clearly the advantages of the invention. Referring to FIG. 1, a prior art type refrigerated compressed gas dryer 15 is shown basically consisting of, as described in the background, a pre-cooler/re-heater heat exchanger 21, a gas-to-refrigerant evaporator heat exchanger 22, a liquid separator 23 and a single or multiple liquid drain valve(s) 24. The incoming warm compressed gas 17, which contains water vapor, flows into the pre-cooler/re-heater 21, where it is cooled by the outgoing cold gas stream 19. The pre-cooler/re-heater 21 helps to reduce the heat load placed on the refrigeration system. As the warm compressed gas stream 17 is cooled, the moisture vapor begins to condense into a liquid. The compressed gas and condensed moisture then leaves the pre-cooler section of the pre-cooler/re-heater 21 and enters the compressed gas inlet 46 of the gas-to-refrigerant evaporator heat exchanger 22. Here the warm compressed gas stream 17 is additionally cooled to a lower temperature, usually 39 degrees Fahrenheit, as the refrigerant evaporates at some temperature (usually about 35 degrees Fahrenheit) below the desired temperature of the compressed gas stream exiting the compressed gas outlet 48 of the evaporator 22. Again, more water vapor is condensed into a liquid state. Exiting the evaporator 22, the cooled compressed gas stream 19 flows into the liquid separator 23, where the condensed liquid is separated from the cooled compressed gas stream 19. After separation, this liquid is collected and removed from the system entirely by one, or many, liquid drain valves 24. The cooled, and liquid-free compressed gas stream 19 then exits the separator and re-enters the pre-cooler/re-heater 21. Here the cooled compressed gas stream 19 is re-heated by transferring heat with the warm incoming compressed gas stream 17. The reheated compressed gas stream 19 then exits the dryer 15 and continues flowing through the compressed gas system piping (not shown). Compressed gas flow rates will vary as a function of time in nearly every compressed gas dryer application. The equipment can be expected to experience flows ranging from the maximum design flow rate down to a no load, or zero flow rate, condition.

The refrigeration system 16 in a typical compressed gas dryer 15 is also shown in FIG. 1. In its basic form, it consists of a refrigeration compressor 25, a refrigerant condenser 26, an expansion/restrictive device 27, and the gas-to-refrigerant evaporator heat exchanger 22 described above. The restrictive devices 27 may include capillary tubes, thermal expansion valves (TXV), orifices, electronic expansion valves, and other devices known in the art. The temperature of the cooled compressed gas 19, as it exits the evaporator 22, defines the thermal performance required of compressed gas dryers. This is typically expressed at the design flow rate. Increased cooling of the warm compressed gas 17 results in lower exiting evaporator 22 compressed gas temperatures and higher levels of moisture removal. However, there is a practical limit to the amount of cooling that can be done in the evaporator 22 of a refrigerated gas dryer. Cooling the warm compressed gas stream 17 down to a temperature below the freezing point of water creates a situation where the condensate can freeze and block the free path of the compressed gas stream, thus, increasing the pressure drop across the dryer 15. In extreme circumstances, the flow can be blocked completely, starving the downstream process of compressed gas. This failure situation will most likely occur during compressed gas flow rates that are much less than the maximum design flow rate. When using evaporators constructed from smooth tubing, the freeze-up failure potential necessitates that the refrigerant temperature in the evaporator 22 be above the freezing point of water, and held fixed and steady, as the load varies from no load to full load. All manufacturers of refrigerated compressed gas drying equipment must address how to control the evaporator 22 refrigerant temperature in order to prevent condensate freeze-up under low or no load operating conditions, while providing the thermal performance advertised at a full load situation. A description of some of these methods follows.

As explained above in the background section, some prior art methods of controlling the evaporator 22 refrigerant temperature do so indirectly by maintaining a generally constant pressure in the evaporator 22 and suction line 31. The pressure being maintained in the suction line 31 generally corresponds to a predetermined refrigerant pressure to be provided at the evaporator. The most common manner of regulating the suction pressure is using a hot gas by-pass valve 28. The by-pass valve 28 is a pressure-regulating valve that can be set to maintain a constant refrigerant suction pressure. The by-pass valve 28 meters high-pressure refrigerant discharge gas into the suction line 31 whenever the suction pressure drops below the set point of the by-pass valve 28. By understanding the saturation temperature/pressure correlation of the refrigerant gas, the evaporator 22 refrigerant temperature is indirectly controlled by maintaining a constant refrigerant suction pressure. The more precisely the suction pressure is maintained constant, the more accurately a constant evaporator 22 temperature is held. A typical pressure setting for the by-pass valve 28 would be a refrigerant saturation pressure that corresponds to 35 degrees Fahrenheit. Placing the equivalent temperature setting above the freezing point of water allows for a small factor of safety in the event of any valve setting drift. FIG. 1 shows the inlet 33 of the by-pass valve 28 connected to the discharge line 36 of the compressor 25 and the outlet 39 of the by-pass valve 28 feeding into the suction line 31. This is the most common method, however, many manufacturers choose to feed the outlet 39 of the hot gas by-pass valve 28 into the inlet 41 of the evaporator 22.

Figure 2:
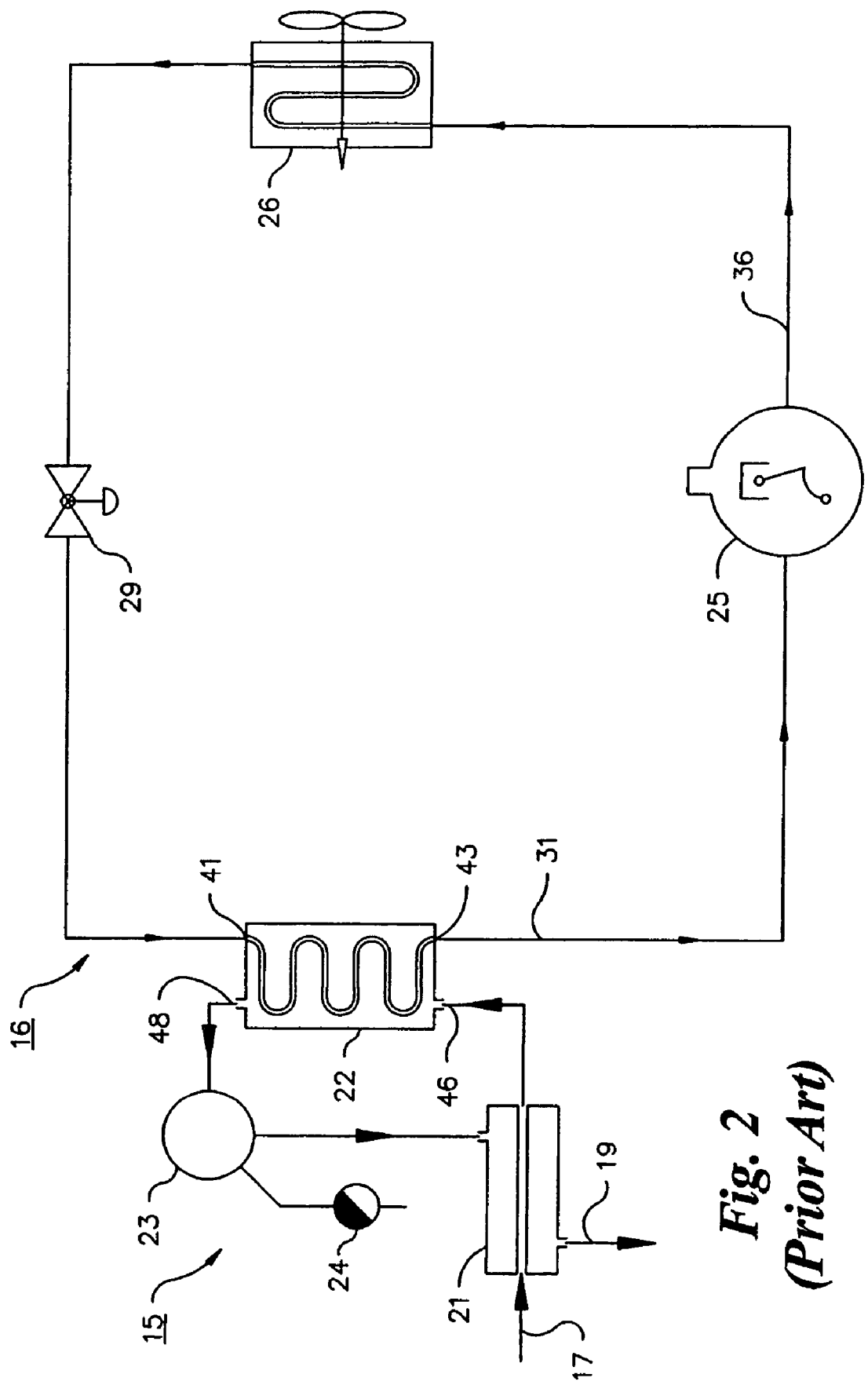
FIG. 2 illustrates diagrammatically a prior art refrigerated compressed gas dryer which uses an automatic pressure valve to regulate suction pressure.

Another commonly used method to maintain a constant refrigerant suction pressure is to replace the expansion/restrictive device 27 and hot gas by-pass valve 28 with an automatic pressure valve ("APV") 29, as shown in FIG. 2. The APV 29 maintains a constant refrigerant suction pressure by metering high-pressure liquid refrigerant into the inlet 41 of the evaporator 22. The APV 29 is typically inexpensive, but not highly accurate. Under no-load conditions, the liquid refrigerant may not be effectively converted into a gas in the evaporator 22, which can result in a liquid flood-back condition at the compressor suction, with potential subsequent compressor 25 damage. Additionally, as the load is applied to the dryer 15, the refrigerant suction pressure often increases resulting in poor thermal performance.

A more recent technology used to maintain a constant refrigerant suction pressure is the use of variable speed refrigerant compressors which operate by altering the rotational speed, and therefore, the pumping capacity of the compressor. To maintain a constant refrigerant suction pressure, the rotational speed of the compressor can be increased or decreased, to decrease or increase, respectively, the suction pressure. However, this design can require the use of power frequency inverters, suction line pressure sensors and/or temperature sensors.

Referring now to FIGS. 3 through 13 generally, a variable evaporator control ("VEC") system and method for a refrigerated compressed gas dryer can be provided, according to the invention, based on an understanding of evaporator performance as discussed previously: that is, under a full load condition, there is a need for either a large temperature difference between the refrigerant and the outlet gas (and less required heat exchanger surface), or a large amount of low cost surface (and a precisely controlled refrigerant temperature), in order to have a cost effective, thermally performing design. In addition, during periods of light load, or no load, the refrigerant temperature in a smooth tube-type evaporator must be accurately and constantly maintained above the freezing point of water. In order to satisfy both of these design constraints, a refrigerant control system can be provided having sufficient intelligence to control, or vary, the refrigerant temperature as compressed gas loads are applied to and removed from the dryer.

FIGS. 3.1 through 3.3 graphically illustrate the design criteria described above and highlight the advantages of a VEC system for controlling, e.g., varying, the evaporator refrigerant temperature. FIG. 3.1 shows the temperature profiles in the evaporator 22 of a typical refrigerated compressed gas dryer 15 as a function of the "characteristic length" of the evaporator 22. The graph assumes an evaporator 22 refrigerant temperature of 35 degrees Fahrenheit that is held constant under all load conditions. A slight amount of refrigerant superheat is present at the refrigerant outlet 43 of the evaporator 22. This superheat is shown as 5 degrees Fahrenheit, and equates to a refrigerant exit temperature of 40 degrees Fahrenheit. Under a full design flow condition, the warm compressed gas stream 17 is cooled from a temperature of 70 degrees Fahrenheit at the compressed gas inlet 46 of the evaporator 22 down to a temperature of 39 degrees Fahrenheit at the compressed gas outlet 48 of the evaporator 22. Heat exchange occurs along the entire length of the evaporator 22. The length of the evaporator 22 in this case is defined, for comparative purposes, as 1.0 (no unit designation). The approach temperature is 4 degrees Fahrenheit. The approach temperature is the difference between the refrigerant (at the refrigerant inlet 41) and the compressed gas (at the compressed gas outlet 48). The dotted line depicts the temperature profile along the length of the evaporator 22 during periods of light load. Note that the approach temperature remains nearly the same as the full load case, and that the entire length of the evaporator 22 is not needed when reduced flows are present. This can be typical of current designs.

FIG. 3.2 shows similar information in type, but with a design that uses a lower evaporator 22 refrigerant temperature of 25 degrees Fahrenheit, and a required evaporator 22 characteristic length of approximately 0.5. The temperature of the cooled compressed gas stream 119, at the compressed gas outlet 48, remains at 39 degrees Fahrenheit and the approach temperature at the outlet 48 is 14 degrees Fahrenheit. This is an acceptable design for a full load condition. However, with current control technology and methods, the evaporator 22 refrigerant temperature would remain constant at 25 degrees Fahrenheit as the load is reduced., or removed. Consequently, if the compressed gas load drops to the light load condition, the compressed gas stream will be cooled to a temperature below the freezing point of water, as the approach temperature nears 4 degrees Fahrenheit. This can lead to a detrimental condensate freeze-up condition.

FIG. 3.3 illustrates operating characteristics which can be obtained according to invention. Since the evaporator 22 refrigerant temperature is readjusted as the load fluctuates from full design load to light and no load, the approach temperature is also readjusted, from 14 degrees Fahrenheit under the full load condition, to 4 degrees Fahrenheit during the light load case. Therefore, the characteristic length of the evaporator 22 can be optimally sized for the full load condition (a 14 degree Fahrenheit approach), resulting in a characteristic length which is approximately 50% that of conventional designs. According to the invention, the VEC system can cause the refrigerant temperature to rise as the load is reduced, thus maintaining a constant compressed gas exit temperature. Ultimately, the evaporator 22 refrigerant temperature is brought above the freezing point of water, thereby safely eliminating the concern of condensate freeze-up.

One aspect of as presently preferred control method/system is controlling the cooling process using feedback from one or more temperature and/or pressure sensors which can indicate the load on the compressor. However, such sensors are not being used simply to maintain a constant refrigerant temperature as in the prior art. Rather, the sensors can be used to implement increased control over the system by monitoring and adjusting the refrigerant temperature, and thus the approach temperature, in the evaporator in order to generally maintain the cooled gas exit temperature at a desired value. The prevailing load on the compressor at a given time can be indirectly indicated by the feedback from the sensors, and the temperature of the refrigerant can be adjusted accordingly, thereby adjusting the approach temperature, to avoid a potential freeze up condition at light or zero loads. Thus, by analyzing the temperature sensor feedback, the microprocessor can determine the compressor load, although, as explained above, the microprocessor does not directly determine the magnitude of the compressor load. Rather, by using the temperature sensor(s) properly and understanding the characteristics of the cooling system, there is no need to know the load on the compressor. The compressed gas exit temperature will be generally maintained regardless of the compressor load.

Consequently, it can be understood that the cooling capability per-unit-length of a heat exchanger of any given fixed length can be maximized by removing the conventional restriction of maintaining a constant approach temperature irrespective of the load on the compressor. The approach temperature can be large, i.e., the refrigerant temperature low, when the load on the compressor is above a certain level, thus maximizing the amount of cooling possible for a given length heat exchanger. However, when the load on the compressor reduces below a certain level, a smaller approach temperature can be implemented, by increasing the refrigerant temperature above freezing, to eliminate any potential for freeze up.

A benefit of a VEC system according to the invention is that a low cost, smooth tube evaporator can successfully be utilized with large temperature differences between the refrigerant and the compressed gas in order to satisfy the desired thermal and pressure drop performance criteria while eliminating the potential of condensate freeze-up during the light load and no load conditions.

Hereinafter, will be described in detail certain presently preferred embodiments of VEC systems for refrigerated compressed gas drying applications. The following description of certain embodiments, as illustrated in FIGS. 4 through 13, are not intended to be exhaustive, but only representative of embodiments of VEC systems according to the invention which can employ currently available supporting technology.

VEC Systems Utilizing an Electronic By-Pass Valve

As previously discussed, the evaporator 22 refrigerant temperature can be controlled indirectly though the control of the refrigerant suction pressure. Traditional technologies have conventionally utilized mechanical pressure regulating valves, such as the hot gas by-pass valve 28, which can be manually set to maintain a constant suction pressure. However, a new technology has emerged which places a small adjustment motor, e.g., a stepper motor, on to the hot gas by-pass valve 28 body, such as the motor 51 shown in FIG. 5, to provide for electronic control of the by-pass valve 28. Electronic hot gas by-pass valves are available manufacturers such as Sporlan Valve Company, headquartered in Washington, Mo. Consequently, by electronic means, the setting of this motor, and thus the by-pass valve 28 can be adjusted as required. Using proper sensing techniques and microprocessor intelligence, the evaporator refrigerant temperature can be adjusted by adjusting the suction pressure. In particular, using the motor 51 operated by-pass valve 28, the suction pressure can be increased to raise the evaporator refrigerant temperature above the freezing point of water when compressed gas loads are removed. The evaporator refrigerant temperature can be measured at the evaporator inlet. Conversely, the suction pressure can be decreased to lower the evaporator refrigerant temperature as the load on the compressor is increased, simply by controlling the stepper motor 51 on the by-pass valve 28. Such a electronically controllable by-pass valve can also be implemented with many of the known refrigerant expansion/metering valves which control the refrigerant flow into the evaporator, such as a capillary tube, a thermal expansion valve, an electronic expansion valve, or an orifice.

Sensing Techniques

Some sensing techniques which can be employed when using an electronically controllable hot gas by-pass valve 28 as part of a VEC system are described below.

A. Suction Pressure/Compressed Gas Temperature

Figure 4:
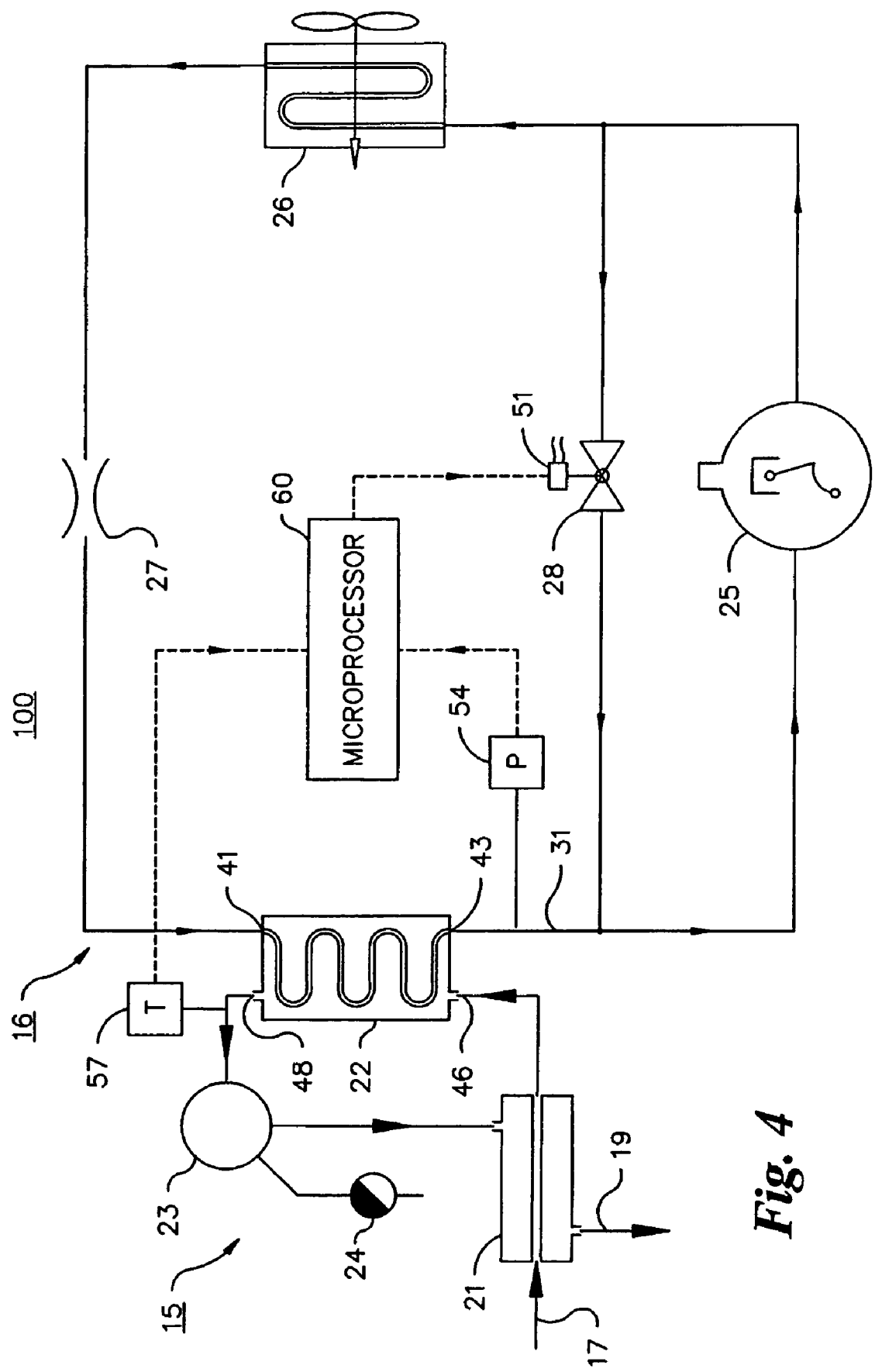
FIG. 4 illustrates diagrammatically a presently preferred embodiment of the invention using pressure and temperature sensors.

A presently preferred embodiment of a VEC system 100 utilizing a by-pass valve 28 which is controllable electronically via motor 51 is shown in FIG. 4. As shown, a pressure sensor 54 can be used to monitor the refrigerant suction pressure in the suction line 31, and a temperature sensor 57 can be used to monitor the compressed gas temperature at the compressed gas outlet 48 of the evaporator 22. Output from the pressure sensor 54 and temperature sensor 57 can be supplied to a processor 60, such as a microprocessor, which can evaluate the information and determine any required adjustments to be made to the by-pass valve 28 via motor 51 as the load on the refrigerant compressor 25 either increases or decreases. The load on the refrigerant compressor 25 can vary due to changes in either the volume or the temperature of the warm compressed gas 17 circulated through the evaporator 22. Specifically, the temperature of the compressed gas stream at the outlet 48 of the evaporator 22 can be monitored to generally maintain this temperature at a desired level. Since the compressed gas exit temperature can change if the load on the gas compressor changes, because the suction pressure is maintained constant by the by-pass valve 28, the compressed gas exit temperature can be utilized to adjust the suction pressure using the motor 51 in order to maintain the compressed gas exit temperature at the desired value. This can maximize the efficiency of the system and eliminate potential freeze up problems.

B. Refrigerant Temperature/Compressed Gas Temperature

Figure 5:
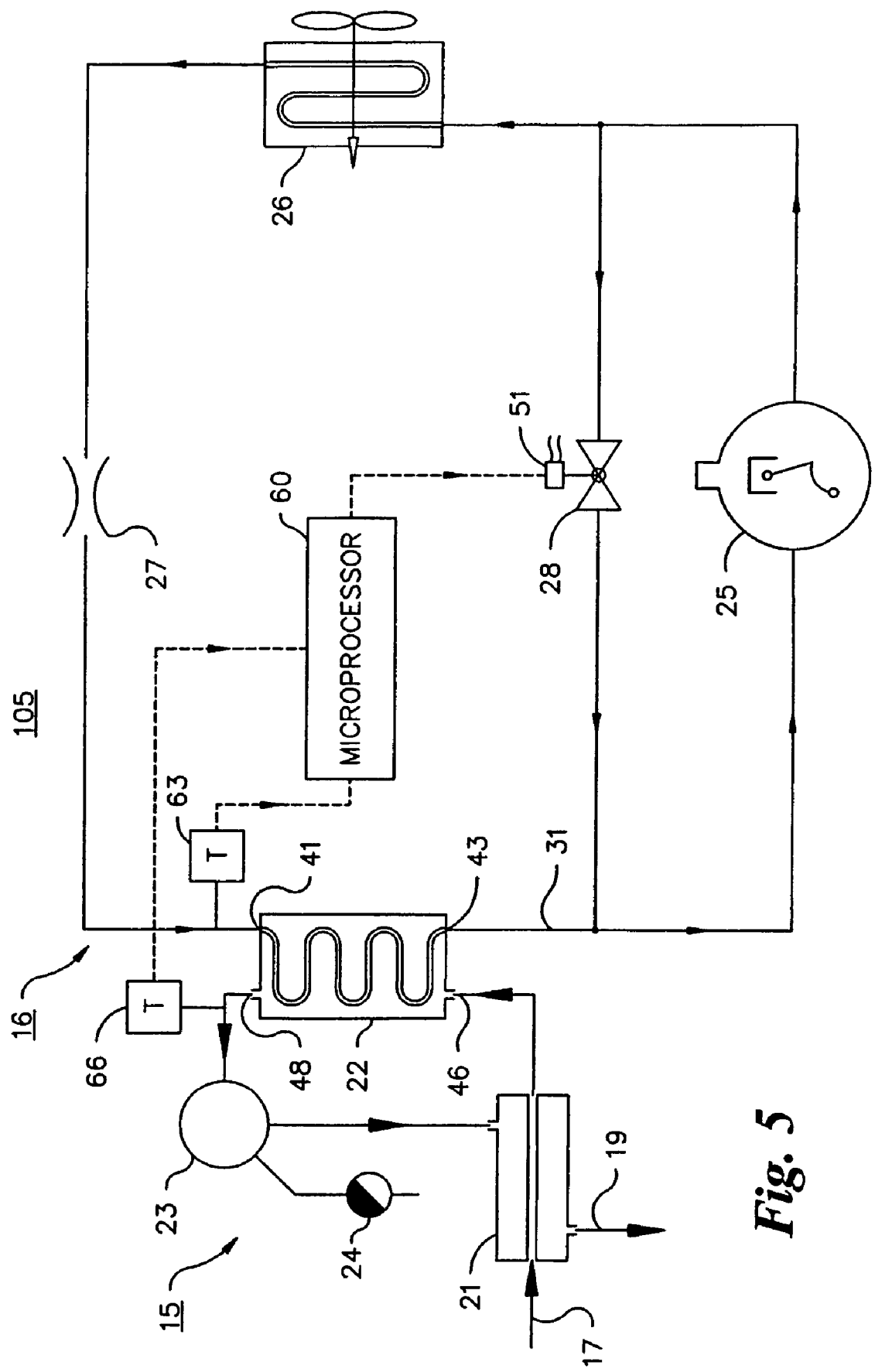
FIG. 5 illustrates diagrammatically an alternative embodiment of the invention using two temperature sensors.

Referring to FIG. 5, another embodiment of a VEC system 105 utilizing a hot gas by-pass valve 25 controllable electronically via motor 51 is shown. In this embodiment, instead of a pressure sensor on the suction line 31, a first temperature sensor 63 can be used to monitor the refrigerant temperature at the evaporator 22 inlet 41. A second temperature sensor 66 can be used to monitor the compressed gas temperature at the compressed gas stream outlet 48 of the evaporator 22. As explained above, this information can be supplied to the microprocessor 60 which can evaluate the information to determine the required adjustment to be made to the by-pass valve 28 via the motor 51 as the load on the compressor 25 increases or decreases.

C. Single Point Temperature

Figure 6:
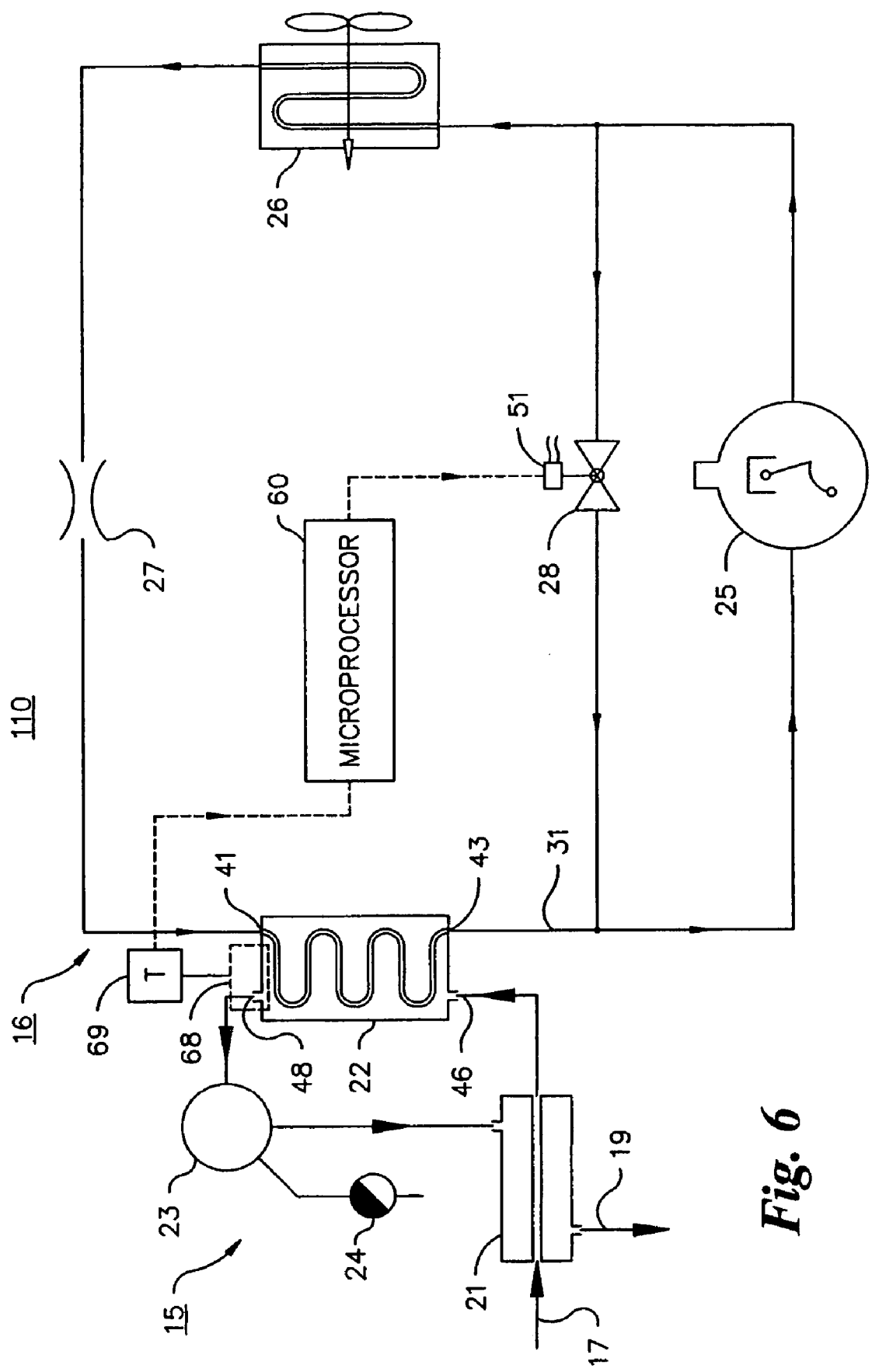
FIG. 6 illustrates diagrammatically an alternative embodiment of the invention using a single temperature sensor.

A further embodiment of a VEC system 110 is shown in FIG. 6, wherein the system can utilize a single point temperature sensing method. This method can require determining an optimum sensing location for a single temperature sensor 69 which can provide the temperature of the compressed gas during periods of actual gas flow and also provide an accurate evaporator 22 refrigerant temperature during periods of no flow. The microprocessor 60 can be supplied with this information and utilize it to determine the required adjustment to be made to the electronically controllable by-pass valve 28 via motor 51 as the load on the compressor 25 is increased or decreased.

Figure 7:
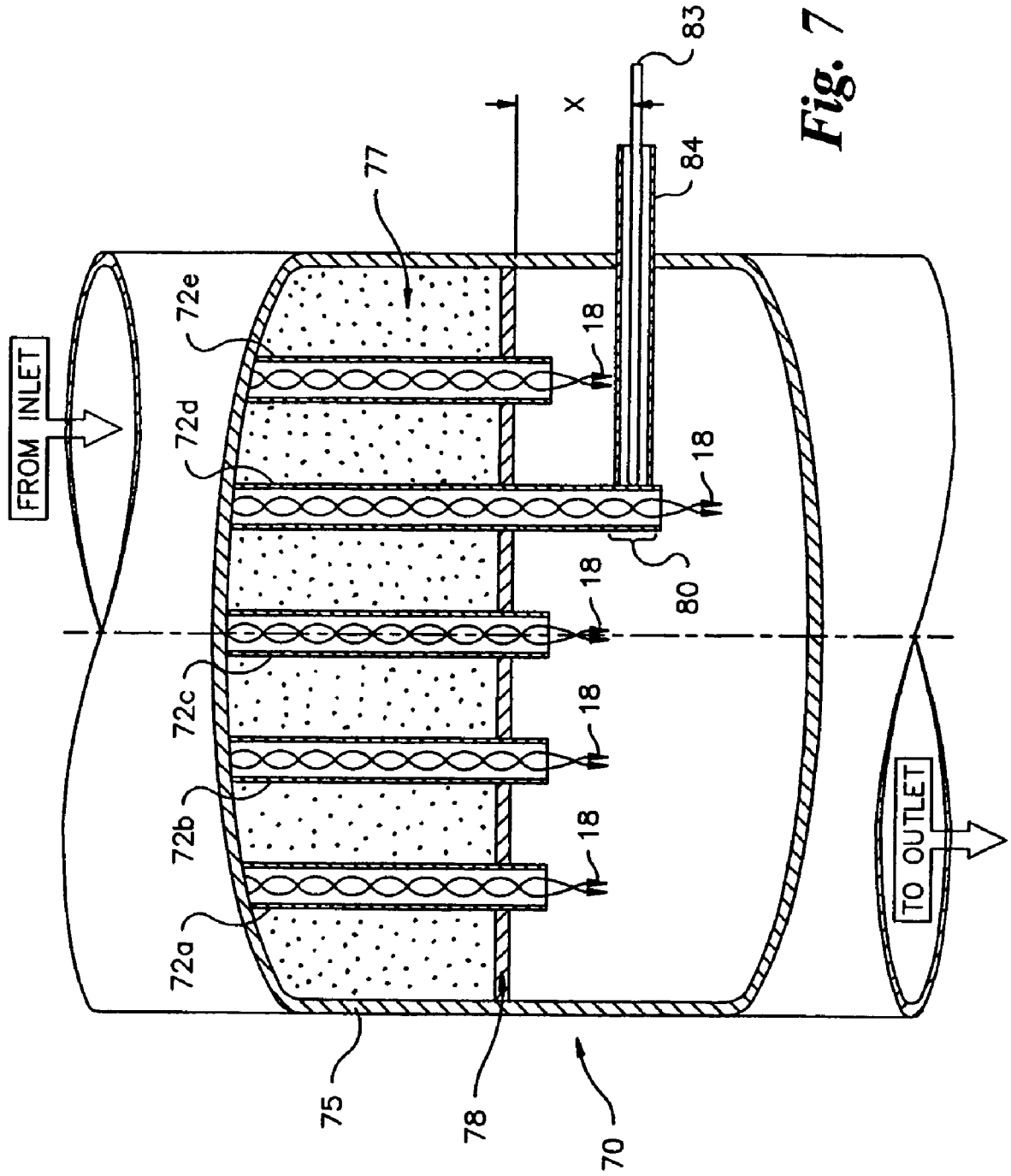
FIG. 7 illustrates an embodiment of a smooth tube evaporator design and a presently preferred embodiment of an apparatus for a single point temperature sensing control system and method for use with the embodiment of the invention shown in FIG. 6.

FIG. 7 illustrates a particular embodiment of the single point temperature sensing method shown in FIG. 6, depicting an optimum location for, and presently preferred embodiment of, a single point temperature sensor 69. The evaporator 22 can be of a design utilizing a multiple smooth tube bundle 72a-72e enclosed in a single cover shell 75. Compressed gas 18 flows through the tubes 72a–72e and the refrigerant 77 resides inside the cover shell 75. The end of the tube bundle 72a–72e can be isolated from the cover shell 75 with, for example, a simple brazed tube sheet 78. The flow pattern is shown counter-flow, with the refrigerant 77 entering the evaporator 22 above the tube sheet 78 located near the compressed gas outlet tubes 72a–72e. The refrigerant 77 exits the evaporator 22 at the opposite end of the evaporator 22, near the compressed gas inlet. As mentioned above, it can be necessary to determine a physical location for the temperature sensor 69 whereby the sensed temperature would be indicative of the compressed gas stream 18 temperature during periods of full and light flow, yet also indicative of the refrigerant 77 temperature in the evaporator 22 during a no load situation. Simply placing the temperature sensor 69 directly in the gas stream 18 can satisfy the initial constraint quite well, but when gas flow ceases, the temperature could rise in the stagnant gas environment, forcing the microprocessor 60 to lower the refrigerant 77 temperature. This result is opposite of the desired effect and can lead to a freeze-up condition. Conversely, by placing the temperature sensor 69 directly in the refrigerant 77, or on the tube sheet 78, the temperature sensor 69 may respond appropriately during the no load condition, but may not behave correctly as a load is applied. In fact, the refrigerant 77 temperature may simply remain constant under all conditions.

Moreover, as further shown in FIG. 7, a presently preferred solution for implementing a VEC system using single point temperature sensing can include placing a thermally conductive extension 80 on the end of one of the smooth tubes, e.g., tube 72d, and then determining the appropriate temperature sensor 69 position (labeled as "x") which can accurately indicate the compressed gas stream 18 temperature when a light to full flow is present (a combination of conductive and convective heat transfer). However, if placed too close to the tube sheet 78, the temperature reading could be biased by conductive heat transfer into the refrigerant 77. Thus, the solution can further include inserting a temperature probe 83 through the wall of the cover shell 75 and assuring proper thermal contact with the outside surface of the extended tube, for example tube 72d. In this manner, during a very light or zero flow condition, a purely conductive heat transfer path can be established with the evaporating refrigerant 77 above the tube sheet 78.

As a result, this solution can provide accurate temperature information permitting control over the system under all conditions by facilitating an indication of the load, i.e., volume of warm compressed gas 17 being circulated through the evaporator 22. By knowing the volume of compressed gas being circulated, i.e., full or light load conditions, the approach temperature can be adjusted accordingly to enable maximum cooling for an evaporator 22 of any given length. For example, as illustrated in the graphs in FIGS. 3.1 through 3.3, a larger approach temperature, i.e., a lower refrigerant inlet temperature, can be implemented during a full load condition with no potential for freeze up. Conversely, a smaller approach temperature, i.e., a higher refrigerant inlet temperature, can be provided during a light load condition to avoid potential freeze up.

A housing 84 can be provided through the cover shell 75 to the extension 80, in which the temperature sensor 83 can be housed. Testing has indicated that, using approximately 0.25 inch (outer diameter) smooth tubes 72a–72d, the proper distance, "x," from the tube sheet 78 can be about 0.25 inch. This distance has been satisfactory for various numbers of the smooth tubes 72a–72d, and different diameter cover shells 75.

In sum, the temperature of the compressed gas at the outlet 48 of the evaporator 22 dominates the sensor 83 reading when there is a light to heavy load on the compressor, and the refrigerant temperature dominates when there is a very light to zero load. Thus, a single-point temperature sensor, when placed in a proper location, can provide sufficient feedback to the microprocessor to control the cooling system regardless of the flow condition, i.e., the volume of warm compressed gas being circulated through the evaporator 22. For example, the compressed gas exit temperature can be set at 37 or 38 degrees Fahrenheit. If the compressed gas exit temperature increases, the refrigerant temperature will be permitted to drop until the 37 degree Fahrenheit temperature is satisfied. This is accomplished with no danger of freeze up because the temperature of the compressed gas is still being maintained above freezing even though the refrigerant temperature may fall below freezing at that set point. Then, if the compressor load drops off, the temperature detected by the sensor 83 will be dominated by the temperature of the refrigerant, due to the conductive heat transfer path directly from the refrigerant. If the compressor load is significantly reduced, the temperature of the compressed gas no longer dominates the temperature sensor 83; the refrigerant temperature now dominates it. However, since the set point is maintained at about 37 degrees Fahrenheit, the refrigerant temperature is permitted to rise above the freezing point of water. When using multiple sensors, the processor may also be programmed with the appropriate logic and comparative information between the two temperatures, i.e., compressed gas temperature versus refrigerant temperature, to properly control the refrigerant temperature.

VEC Systems Utilizing an Unloading-type Compressor

Another presently preferred embodiment of a VEC system can rely on varying the capacity of the compressor to control the refrigerant suction pressure, and corresponding evaporator refrigerant temperature. This can be realized through the use of unloading-type refrigerant compressors. Whenever a lower suction pressure (lower evaporator refrigerant temperature) is desired, the capacity of the compressor can be increased; conversely, as the need for increasing suction pressure (higher evaporator refrigerant temperature) is detected, the compressor capacity can be decreased. This capacity control can be achieved discretely (i.e., fill capacity or no capacity) in some compressor designs, such as the digital, or unloading, scroll compressor. Other models of multi-cylinder reciprocating compressors are designed to permit levels of capacity reduction, or capacity addition, in steps. Using various sensing techniques and the proper microprocessor intelligence, the suction pressure can therefore be raised as compressed gas loads are removed, or lowered as the load increases, by activating these unloading and loading mechanisms.

Sensing Techniques

Some sensing techniques which can be employed when using unloading type compressors as part of a VEC system are described below.

A. Suction Pressure/Compressed Gas Temperature

Figure 8:
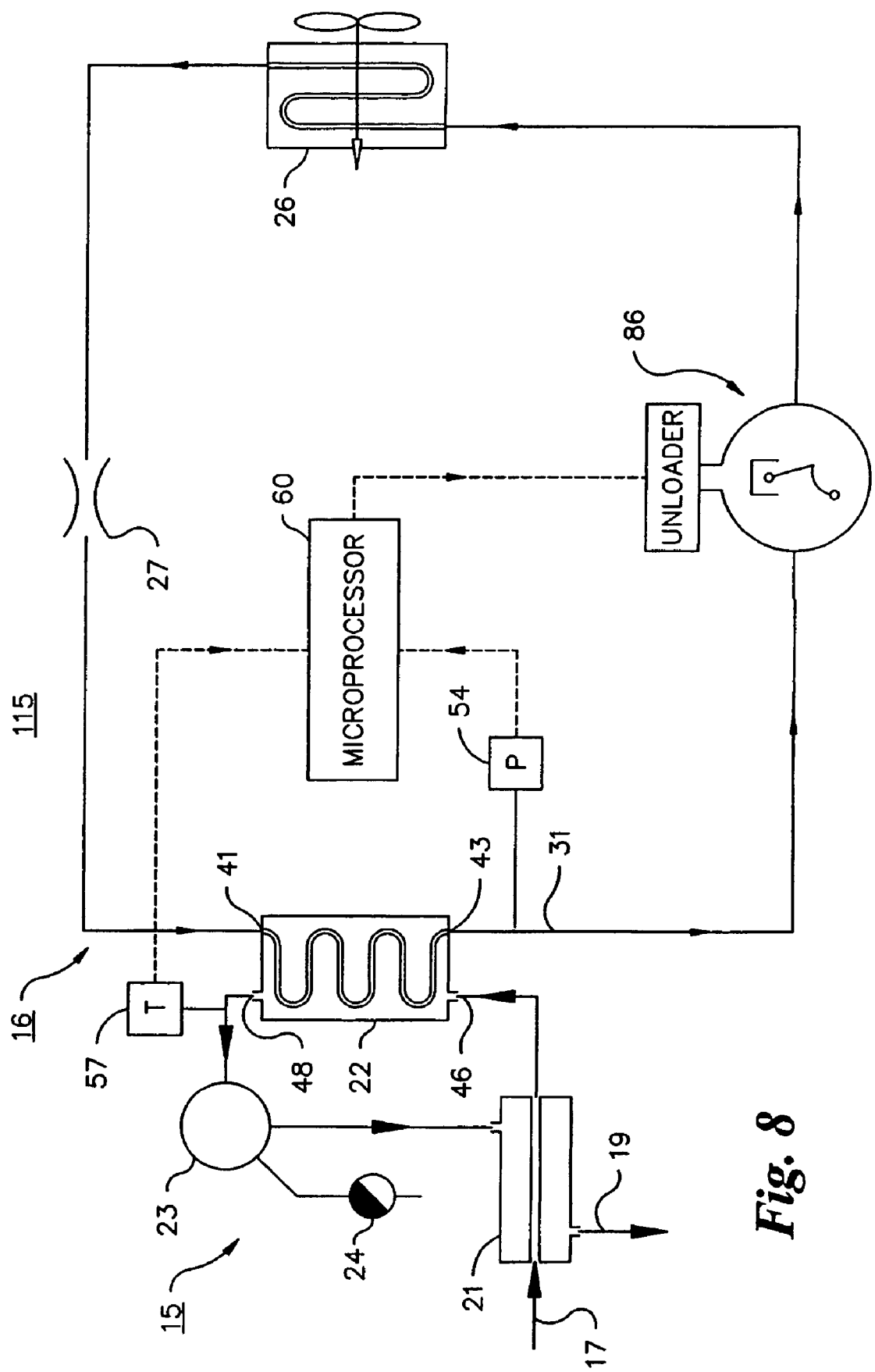
FIG. 8 illustrates diagrammatically an alternative embodiment of the invention similar to that shown in FIG. 4 except using an unloading compressor.

A presently preferred embodiment of a VEC system 115 utilizing an unloading type compressor 86 is shown in FIG. 8. In this embodiment, similarly to the embodiment shown in FIG. 4, pressure sensor 54 can be used to monitor the refrigerant suction pressure at the suction line 31 and temperature sensor 57 can be used to monitor the compressed gas temperature at the compressed gas outlet 48 of the evaporator 22. The microprocessor 60 can receive and evaluate this information to determine when to load or unload the compressor 86 in order to adjust the suction pressure, and thus the evaporator 22 refrigerant temperature, as the compressor 86 load is increased and decreased.

B. Refrigerant Temperature/Compressed Gas Temperature

Figure 9:
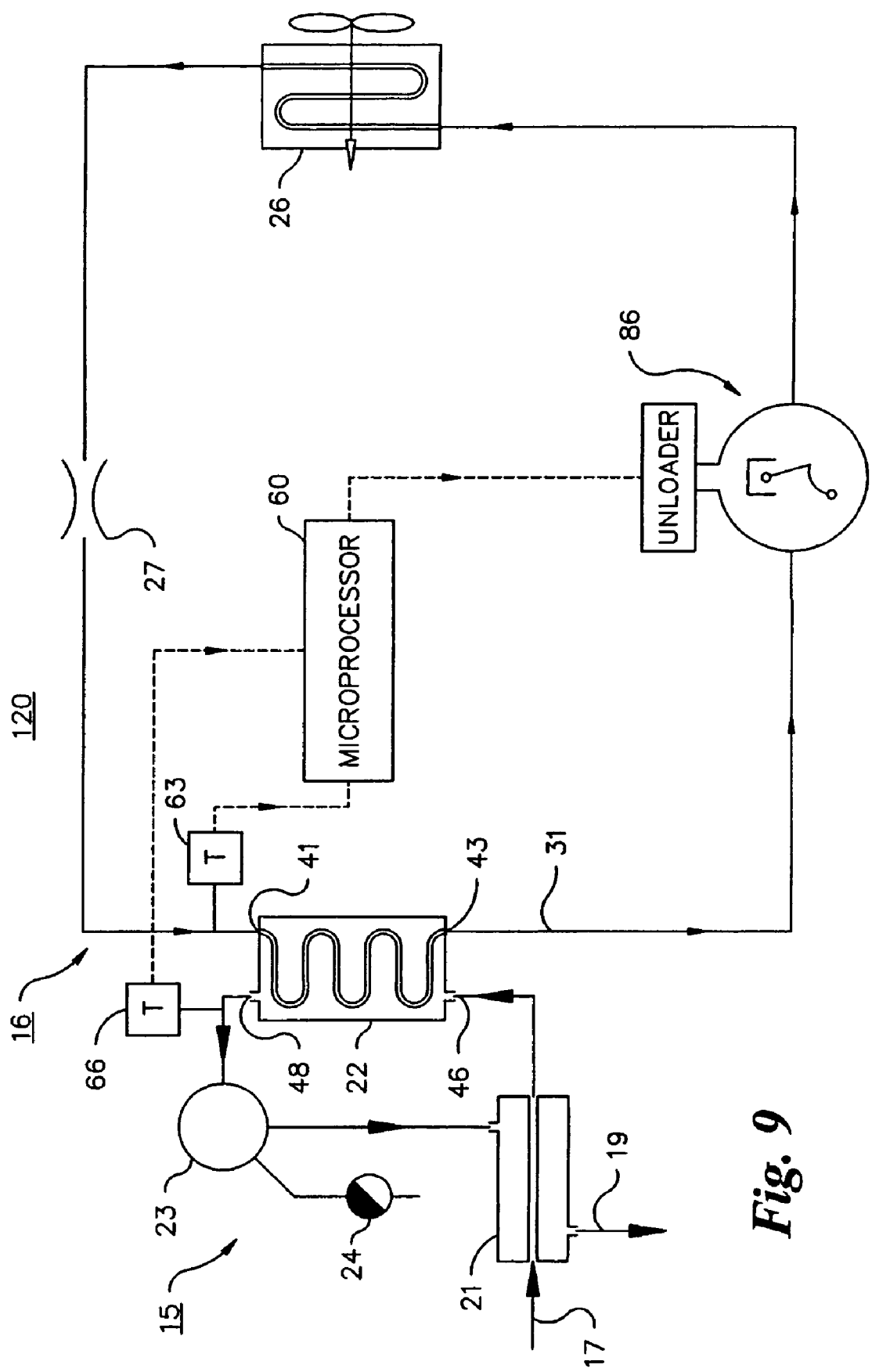
FIG. 9 illustrates diagrammatically an alternative embodiment of the invention similar to that shown in FIG. 5 except using an unloading compressor.

Referring to FIG. 9, another embodiment of a VEC system 120 utilizing an unloading type compressor 86 is shown wherein, similarly to FIG. 5, first temperature sensor 63 can be used to monitor the refrigerant temperature at the inlet 41 of the evaporator 22 and second temperature sensor 66 can be used to monitor the compressed gas temperature at the evaporator 22 compressed gas stream outlet 48. The microprocessor 60 then receives and utilizes this information to determine when to load or unload the compressor 86 in order to adjust the suction pressure as the compressor 86 load is increased or decreased.

C. Single Point Temperature

Figure 10:
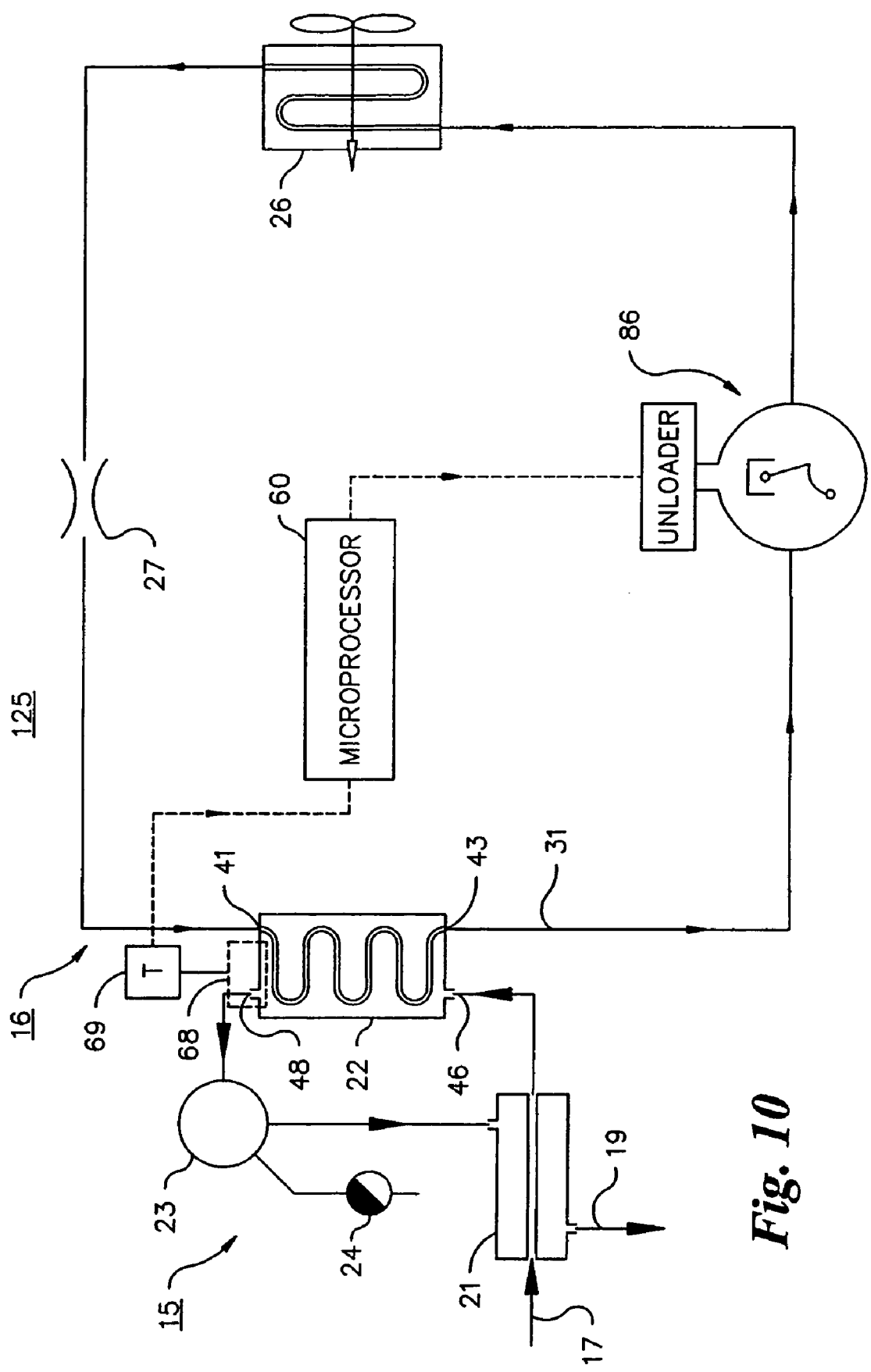
FIG. 10 illustrates diagrammatically an alternative embodiment of the invention similar to that shown in FIG. 6 except using an unloading compressor.

Similarly to FIG. 6, FIG. 10 illustrates an embodiment of a VEC system 125 utilizing an unloading type compressor 86 in a single point temperature sensing method. As explained previously, this method can require determining an optimum sensing location for the single temperature sensor 69 which can accurately indicate both the temperature of the compressed gas during periods of actual gas flow, and the evaporator 22 refrigerant temperature during periods of no flow. The microprocessor 60 can be supplied with this information which is evaluated to determine when to load or unload the compressor 86 in order to adjust the suction pressure as the load on the compressor 86 is increased or decreased. For details regarding locating an appropriate temperature sensing location for the temperature sensor 69, refer to the description provided in connection with FIG. 7.

VEC Systems Utilizing a Variable Speed Compressor

As noted earlier, variable speed refrigerant compressors are available which can vary the refrigeration capacity by altering the rotational speed of the compressor. This type of compressor can also be utilized in embodiments of a VEC system as a means to change the refrigerant suction pressure as compressed gas loads are applied to and removed from the dryer. To increase the refrigerant suction pressure, the speed of the compressor can be decreased; to decrease the refrigerant suction pressure, the speed can be increased. Using various sensing techniques and the proper microprocessor intelligence, the suction pressure can be raised as compressed gas loads are removed, and lowered as compressed gas loads increase, by controlling the rotational speed of the compressor.

Sensing Techniques

Some sensing techniques which can be employed when using variable speed compressors as part of a VEC system are described below.

A. Suction Pressure/Compressed Gas Temperature

Figure 11:
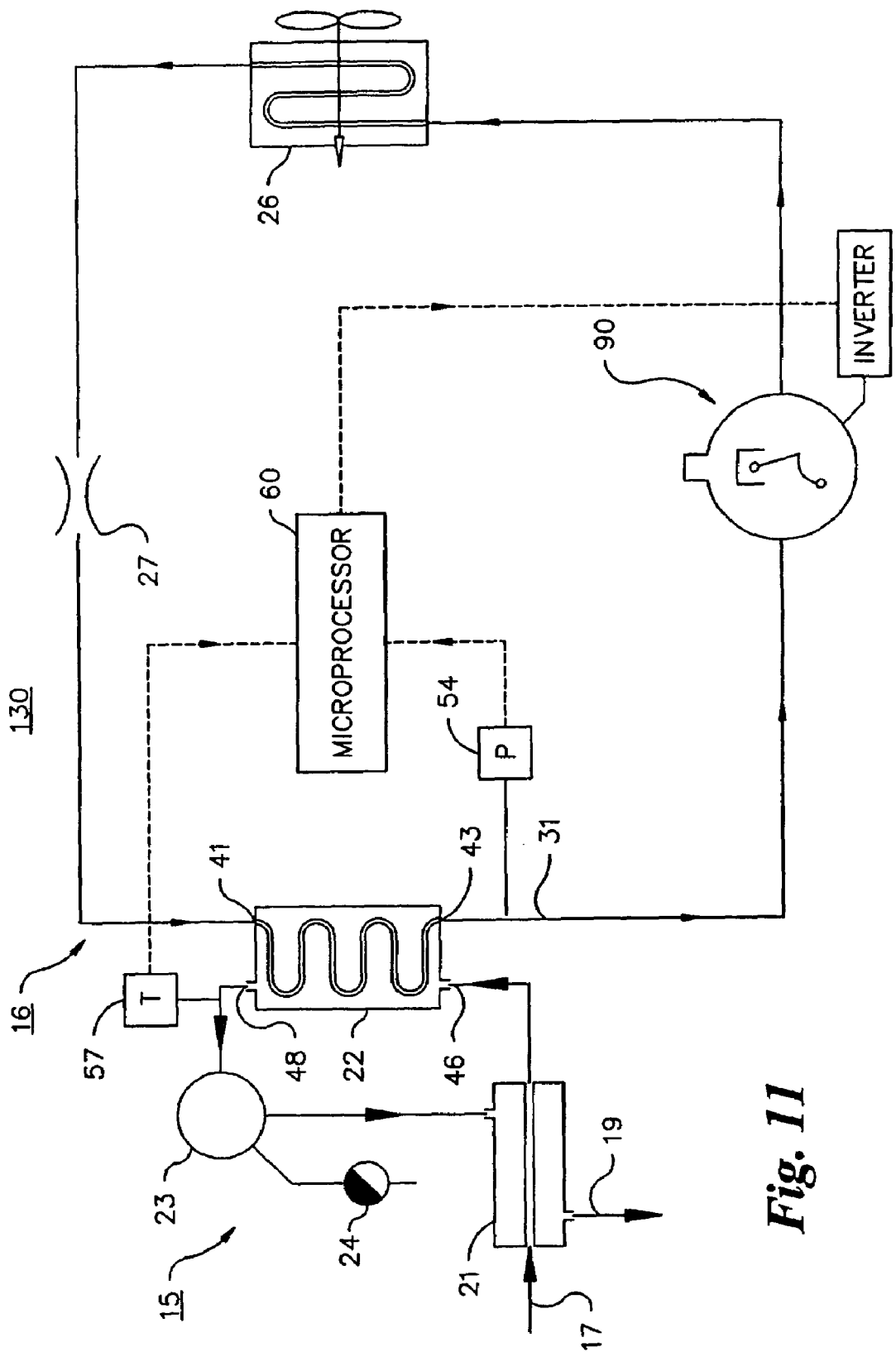
FIG. 11 illustrates diagrammatically an alternative embodiment of the invention similar to that shown in FIGS. 4 and 8, except using a variable speed compressor.

FIG. 11 illustrates an embodiment of a VEC system 130 utilizing a variable speed compressor 90. In this embodiment, similarly to the embodiments of the invention shown in FIGS. 4 and 8, pressure sensor 54 can monitor the refrigerant suction pressure at the suction line 31 and temperature sensor 57 can monitor the compressed gas temperature at the outlet 48 evaporator 22. This information can be supplied to the microprocessor 60 which can evaluate the information and determine whether to increase or decrease the rotational speed of the compressor 90 to adjust the suction pressure, and thus the evaporator refrigerant temperature, as the compressed gas load on the compressor 90 is increased or decreased.

B. Refrigerant Temperature/Compressed Gas Temperature

Figure 12:
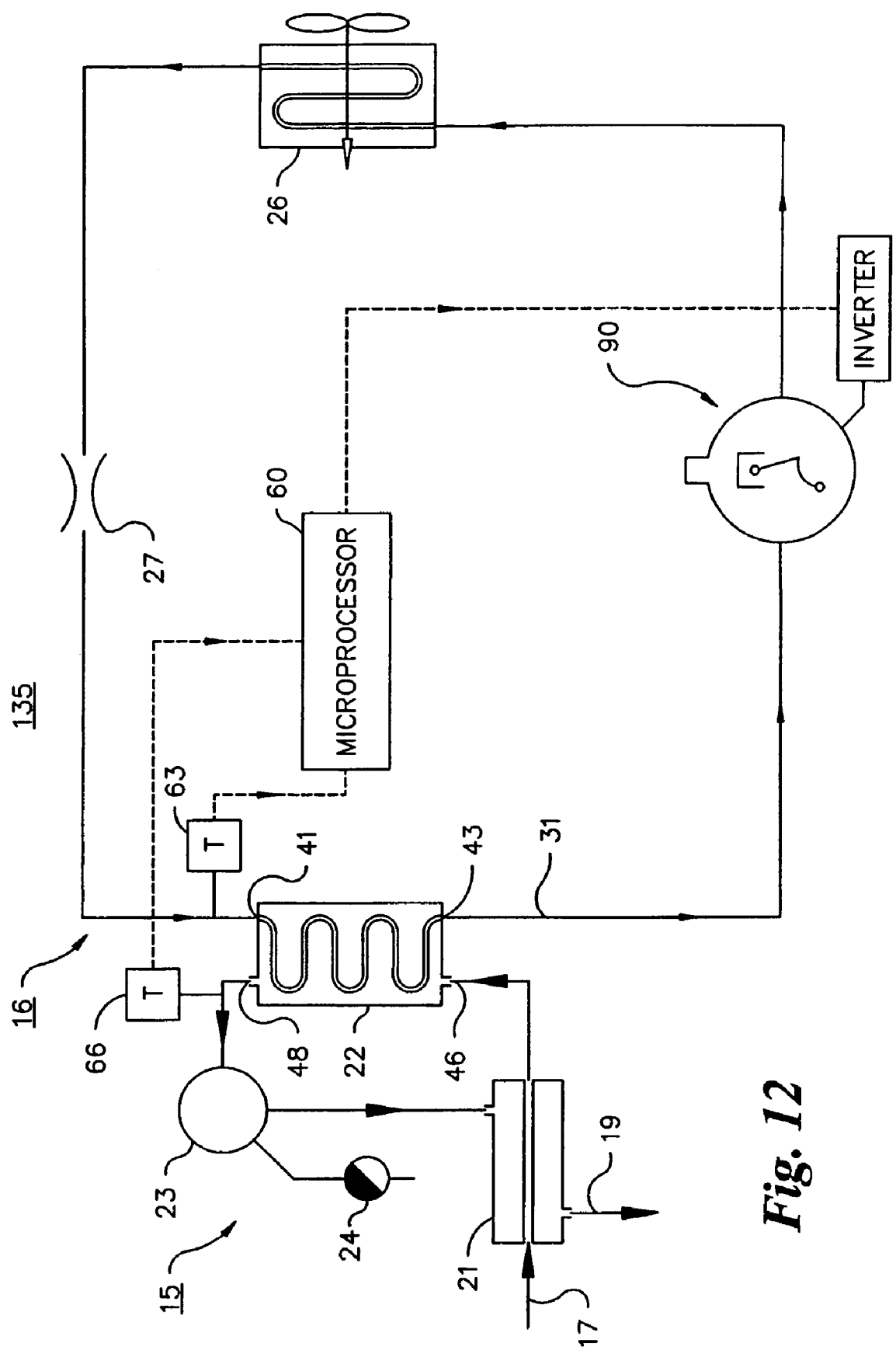
FIG. 12 illustrates diagrammatically an alternative embodiment of the invention similar to that shown in FIGS. 5 and 9, except using a variable speed compressor.

Similarly to FIGS. 5 and 9, another embodiment of a VEC system 135 using a variable speed compressor 90 is shown in FIG. 12. In this VEC system 135, first temperature sensor 63 can monitor the evaporator 22 refrigerant temperature at the inlet 41 to the evaporator 22 and second temperature sensor 66 can monitor the compressed gas temperature at outlet 48 of the evaporator 22. This information can be supplied to the microprocessor 60 for use in determining whether to increase or decrease the rotational speed of the refrigerant compressor 90 in order to adjust the suction pressure as the compressed gas load on the compressor 90 is increased or decreased.

C. Single Point Temperature

Figure 13:
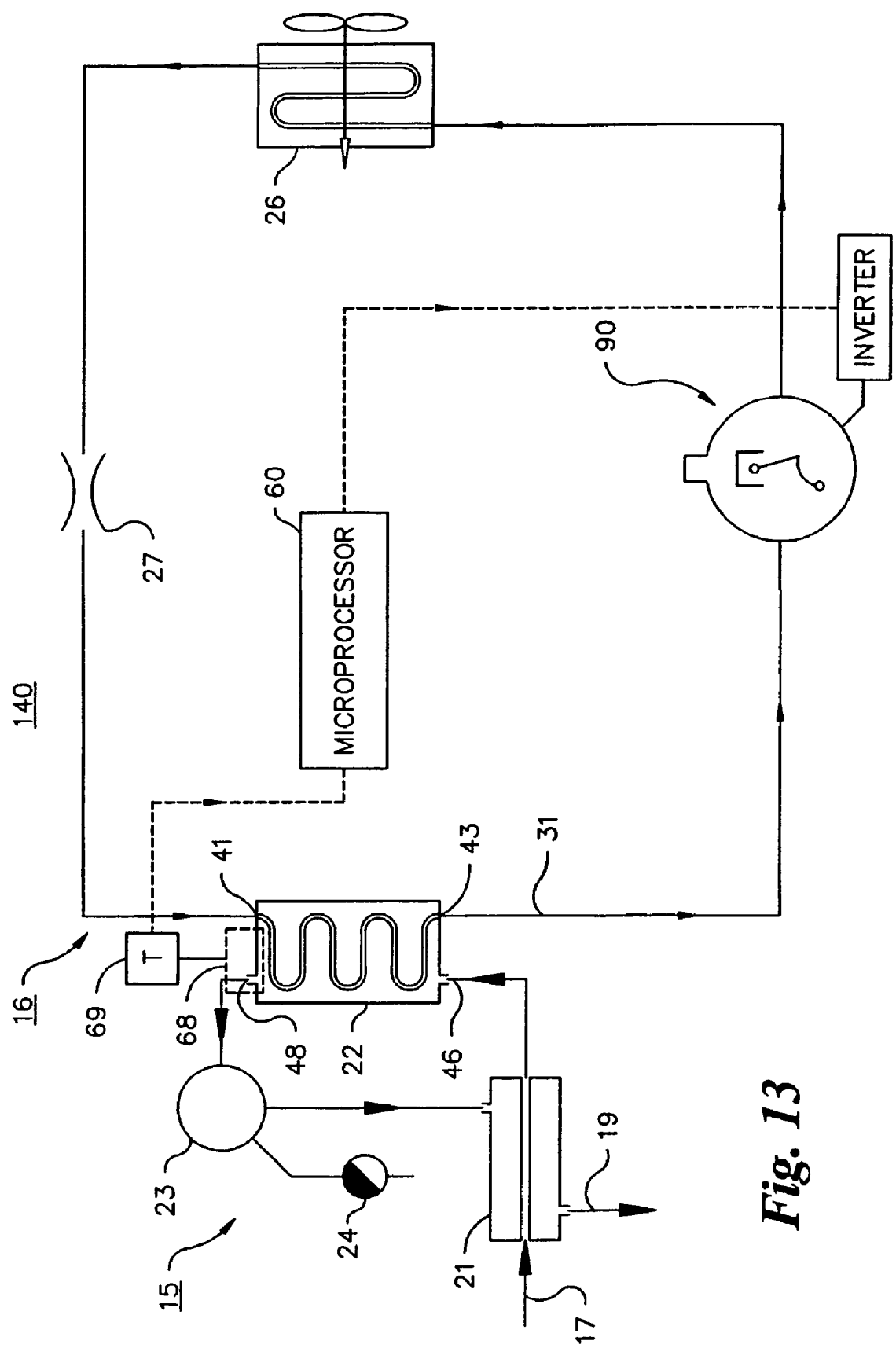
FIG. 13 illustrates diagrammatically an alternative embodiment of the invention similar to that shown in FIGS. 6 and 10, except using a variable speed compressor.

Similarly to FIGS. 6 and 10, FIG. 13 illustrates a further embodiment of a VEC system 140 using a single point temperature sensing method. As explained previously, this method can require determining an optimum location for the single temperature sensor 69 which will be indicative of the compressed gas temperature during periods of actual gas flow, and will also provide an accurate refrigerant evaporator 22 refrigerant temperature during periods of no flow. The microprocessor 60 can be provided with this information for use in and determining whether to increase or decrease the rotational speed of the refrigerant compressor 90 in order to adjust the suction pressure as the load on the compressor 90 is increased or decreased. For details regarding locating an appropriate temperature sensing location, refer to the description provided in connection with FIG. 7.

As can be understood from the preceding description of certain embodiments of the invention, such a control system and method can permit the use of smaller evaporators in conjunction with compressed gas dryers, which provides more efficient packaging, lower manufacturing costs, and reduced pressure drop. Using the control system with smooth tube evaporator designs also permits non-fouling heat exchange performance, lower manufacturing costs and reduced pressure drop. The control system thus permits the use of compact heat exchanger designs employing refrigerant temperatures below the freezing point of water (plate heat exchangers, bar and frame heat exchangers, etc.) without the danger of condensate freeze-up at light load and no load conditions by adjusting the approach temperature according to changes in the warm compressed gas load. Since the control system can respond to the actual compressed gas temperature, proper and constant dryer performance and moisture removal at all flow rates and conditions can be assured. The control system can also be embodied in many of the current technologies available for refrigerant evaporator pressure/temperature control. These technologies may exist as control components, e.g., control valves, or as integral systems contained in the refrigerant compressors, such as unloading mechanisms, variable speed models, and the like.

Moreover, those of skill in the art will recognize that such a control system according to the invention can also be adapted for applications in other areas of refrigeration and cooling. Accordingly, although certain embodiments of the invention have been described in detail, it will be appreciated by those skilled in the art that various modification to those details could be developed in light of the overall teaching of the disclosure. Therefore, the particular embodiments disclosed herein are intended to be illustrative only and not limiting to the scope of the invention which should be awarded the full breadth of the following claims and any and all embodiments thereof.

What is claimed is:

1. A variable evaporator control refrigerated compressed gas dryer comprising:
   a. an evaporator heat exchanger having a first flow path for compressed gas at a first temperature;
   b. said evaporator heat exchanger having a second flow path for a refrigerant at a second temperature which is lower than said first temperature to cool said compressed gas to a third temperature;
   c. a compressor to circulate said refrigerant at a predetermined pressure, said predetermined pressure having a correlation to said second temperature;
   d. a temperature sensor to sense said third temperature at an outlet of said first flow path, wherein said temperature sensor positioned at a single location to sense a fourth temperature wherein said fourth temperature is representative of said third temperature when a compressed gas load is above a certain level, and representative of said second temperature when said compressed gas load is below said certain level;
   e. a valve intermediate said second flow path and a source of refrigerant, said valve controllable to admit refrigerant into circulation to adjust said predetermined pressure; and
   f. a controller connected to receive feedback from said temperature sensor indicative of said third temperature, said controller controlling said valve to adjust said predetermined pressure and thus adjust said second temperature to generally maintain said third temperature at a desired value, wherein said controller connected to receive feedback from said temperature sensor indicative of said fourth temperature to control said valve to adjust said predetermined pressure and thus said second temperature such that said fourth temperature is generally maintained at said desired value; and
   g. a smooth tube evaporator heat exchanger.

2. The compressed gas dryer of claim 1 wherein said smooth tube evaporator heat exchanger further comprises:
   a. an outer cover;
   b. a plurality of smooth tubes enclosed within said outer cover, said first flow path being at least partially through said plurality of smooth tubes;
   c. said second flow path being within said outer cover and communicating with an exterior of said plurality of smooth tubes;
   d. a tube sheet dividing a portion of said evaporator heat exchanger, said second flow path communicating on a first side of said tube sheet;
   e. each of said plurality of smooth tubes having an end extending through said tube sheet to a second side thereof which is not in communication with said second flow path; and
   f. said single point temperature sensor being disposed in contact with said end of at least one of said plurality of smooth tubes which extends through said tube sheet.

3. The compressed gas dryer of claim 2 further comprising said end in contact with said single point temperature sensor having an extended length portion, and said single point temperature sensor disposed in contact with said extended length portions.

4. A variable evaporator control system comprising:
   a. an evaporator heat exchanger having a first flow path for a gas at a first temperature and a second flow path for circulation of a refrigerant at a second temperature which is lower than said first temperature to cool said gas to a third temperature;
   b. a compressor to circulate said refrigerant;
   c. a temperature sensor positioned in said evaporator heat exchanger at a single location to sense a fourth temperature which is representative of said third temperature when a gas load is above a certain level, and representative of said second temperature when said gas load is below said certain level; and
   d. a controller connected to receive feedback from said temperature sensor indicative of said fourth temperature to control said second temperature to generally maintain said fourth temperature at a desired value.

5. The variable evaporator control system of claim 4 further comprising:
   a. compressor to circulate said refrigerant at a predetermined pressure, said second temperature having a correlation to said predetermined pressure; and
   b. a valve positioned intermediate said second flow path and a source of refrigerant, said valve controllable by said controller to adjust admission of said refrigerant into circulation to adjust said predetermined pressure and thus adjust said second temperature to generally maintain said fourth temperature at said desired value.

6. A compressed gas dryer having a heat exchanger with a first flow path for a compressed gas and a second flow path for a refrigerant to cool said compressed gas, the compressed gas dryer comprising:
   a. a temperature sensor to sense a temperature of said compressed gas at an outlet of said first flow path;
   b. a controller connected to receive feed back from said temperature sensor indicative of said temperature of said compressed gas at said outlet of said first flow path, said controller controlling a temperature of said refrigerant at an inlet of said second flow path to generally maintain said temperature of said compressed gas at said outlet of said first flow path at a desired value;
   c. said temperature sensor of said compressed gas at said outlet of said first flow path being positioned in said heat exchanger at a single location;
   d. a temperature sensed at said single location being representative of said temperature of said compressed gas at said outlet of said first flow path when a compressed gas load is above a certain level; and
   e. said temperature sensed at said single location being representative of said temperature of said refrigerant at said second flow when said compressed gas load is below said certain level.

7. The compressed gas dryer of claim 6 further comprising:
   said controller controlling said temperature of said refrigerant at said inlet of said second flow path to generally maintaining said temperature sensed at said single location at said desired value.

8. The compressed gas dryer of claim 7 wherein said desired value further comprises a value above 32 degrees Fahrenheit.

* * * * *